(12) United States Patent
Strubbe et al.

(10) Patent No.: US 6,604,059 B2
(45) Date of Patent: Aug. 5, 2003

(54) PREDICTIVE CALENDAR

(75) Inventors: Hugo J. Strubbe, Yorktown Hts, NY (US); Srinivas Gutta, Buchanan, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 157 days.

(21) Appl. No.: 09/902,215

(22) Filed: Jul. 10, 2001

(65) Prior Publication Data

US 2003/0014292 A1 Jan. 16, 2003

(51) Int. Cl.[7] .............................................. G06F 15/00
(52) U.S. Cl. ...................................... 702/178; 700/295
(58) Field of Search .................... 702/176, 177, 702/178; 705/8, 9, 12, 27; 700/295; 600/551; 345/751, 156

(56) References Cited

U.S. PATENT DOCUMENTS 4,853,854 A * 8/1989 Behar et al. ................. 700/295
5,884,282 A * 3/1999 Robinson ..................... 705/27
6,381,580 B1 * 4/2002 Levinson ...................... 705/8
2003/0001727 A1 * 1/2003 Steinmark

FOREIGN PATENT DOCUMENTS

DE     19810209 A     9/1999     ............ G09D/3/00

OTHER PUBLICATIONS

US 5,749,074, 5/1998, Kasso et al. (withdrawn)
Vollman et al: "Manufacturing Planning and Control System" 1988, Irwin, USA, pp. 35–69,& 674–685.

* cited by examiner

Primary Examiner—John Barlow
Assistant Examiner—Xiuqin Sun

(57) ABSTRACT

A method and system for recommending future events or appointments are disclosed. The inventive system stores a repeat rate provided by users in the system, then recommends future events or appointments based on what the user has rated and the past frequency of those events or appointments which the user has attended. This invention is based on the fact that people have a tendency to attend or observe similar events as in the past and will show such tendency in the future.

18 Claims, 6 Drawing Sheets

| EVENT | DATE | WHO | REMINDER |
|---|---|---|---|
| $BIRTHDAY_1$ | 10-9-38 | MOTHER | YEARLY |
| $BIRTHDAY_2$ | 9-24-68 | BROTHER | YEARLY |
| HOSPITAL VISIT | 5-24-01 | UNCLE | MONTHLY |
| PTA MEETING | 5-30-01 | SON | BI-YEARLY |
| ANNIVERSARY | 4-24-73 | BOB | YEARLY |
| INTENSIVE CASE | 5-15-01 | ANDREW | WEEKLY |
| ⋮ | ⋮ | ⋮ | ⋮ |
| ⋮ | ⋮ | ⋮ | ⋮ |

FIG. 3

|  | 1999 | 2000 | 2001 |
|---|---|---|---|
| GOLF WITH TONY | 3/YR | 4/YR | 1/YR |
| VISITING HOWARD IN CONNT. | 6/YR | 4/YR | 1/YR |
| HAPPY HOUR WITH CLIENT X | 10/YR | 7/YR | 4/YR |
| VISITING SISTER IN CALIFORNIA | 2/YR | 1/YR | 1/YR |
| ATTENDING MOVIE FESTIVAL IN MONTREAL | 2/YR | 1/YR | 1/YR |
| ⋮ | ⋮ | ⋮ | ⋮ |

FIG. 4

|  | TONY | | | DAN | | | ROSS | | |
|---|---|---|---|---|---|---|---|---|---|
|  | 1999 | 2000 | 2001 | 1999 | 2000 | 2001 | 1999 | 2000 | 2001 |
| GOLF OUTING | 3 | 4 | 1 | 2 | 1 | 1 | 0 | 0 | 0 |
| VISITING HOWARD IN CONN. | 0 | 0 | 0 | 0 | 0 | 0 | 0 | 0 | 1 |
| HAPPY HOUR WITH CLIENT | 8 | 7 | 6 | 10 | 8 | 9 | 10 | 10 | 10 |
| VISITING SISTER IN CALIFORNIA | 0 | 0 | 0 | 0 | 0 | 0 | 0 | 0 | 0 |

FIG. 5

PREDICTIVE CALENDAR

BACKGROUND OF THE INVENTION

1. Field of the Invention

This invention relates to a calendar system, and more particularly, to a system and method for recommending future appointments or events automatically.

2. Description of the Related Art

With the advent of computer systems, there is an ample number of electronic calendaring applications that provide the ability to schedule daily, monthly, and yearly activities, so that a great amount of paper that comprises a single year of a day planner is no longer necessary. Typical appointment calendaring systems contain similar functions for noting different activities, such as phone calls, thing to-do lists, events, reservations, notes, and other information.

In modern society, people appreciate a heightened awareness of the value of time and records of specific events in carrying out their daily activities. To this end, many planning devices and software are available to provide flexible scheduling and reminder capabilities for facilitating access to information on any given day. Some attend seminars to learn how to manage and prioritize their time. Hence, time and event management has become an important role for success in the business community as well as in personal life. Although most existing systems and applications may allow a person to manage their time efficiently, they do little to help in carefully monitoring appointments or events. For example, in a typical electronic calendar system, past events are ignored and do not prompt or recommend the user in due time that he or she should make another appointment, as a kind of follow-up for a previous event, unless the user specifically lists those events in the automatic reminder section of the program. Therefore, it would be advantageous to develop a method and system that is capable of assisting the user become aware of past appointments or events, so that the frustration associated with missing important future appointments or events can be minimized.

SUMMARY OF THE INVENTION

The present invention is directed to a method and system for recommending a possible future meeting or event based on a past database.

Accordingly, the system determines a repeat rate for a particular past event, which is stored in a database to remind the user of making a similar event or appointment. Upon receiving at least one event reminder from the user, the past repeat rate is compared to the current repeat rate to recommend a future reminder in due course. To this end, the user must have a past repeat rate in the database for at least one common item. Then, the system determines a statistical number of occurrences for a particular event. The system derives the statistical number by taking into account the probability that a random user will perform a particular event.

DETAILED DESCRIPTION OF THE DRAWINGS

A more complete understanding of the method and apparatus of the present invention available by reference to the following detailed description when taken in conjunction with the accompanying drawings wherein:

FIG. 1 is a simplified block diagram of one embodiment of the computer system that may incorporate the teachings of the present invention;

FIGS. 2(a) and 2(b) show flow charts illustrating one embodiment of the predicting process of the present invention;

FIG. 3 is a table illustrating information stored in the user profile database in accordance with the present invention;

FIG. 4 is another illustrative data stored in the user profile database in accordance with the present invention; and, FIG. 5 is another illustrative data stored in a database containing information of others in accordance with the present invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of simplicity and clarity, detailed descriptions of well-known devices, circuits, and methods are omitted so as not to obscure the description of the present invention with unnecessary detail.

Figure 1:
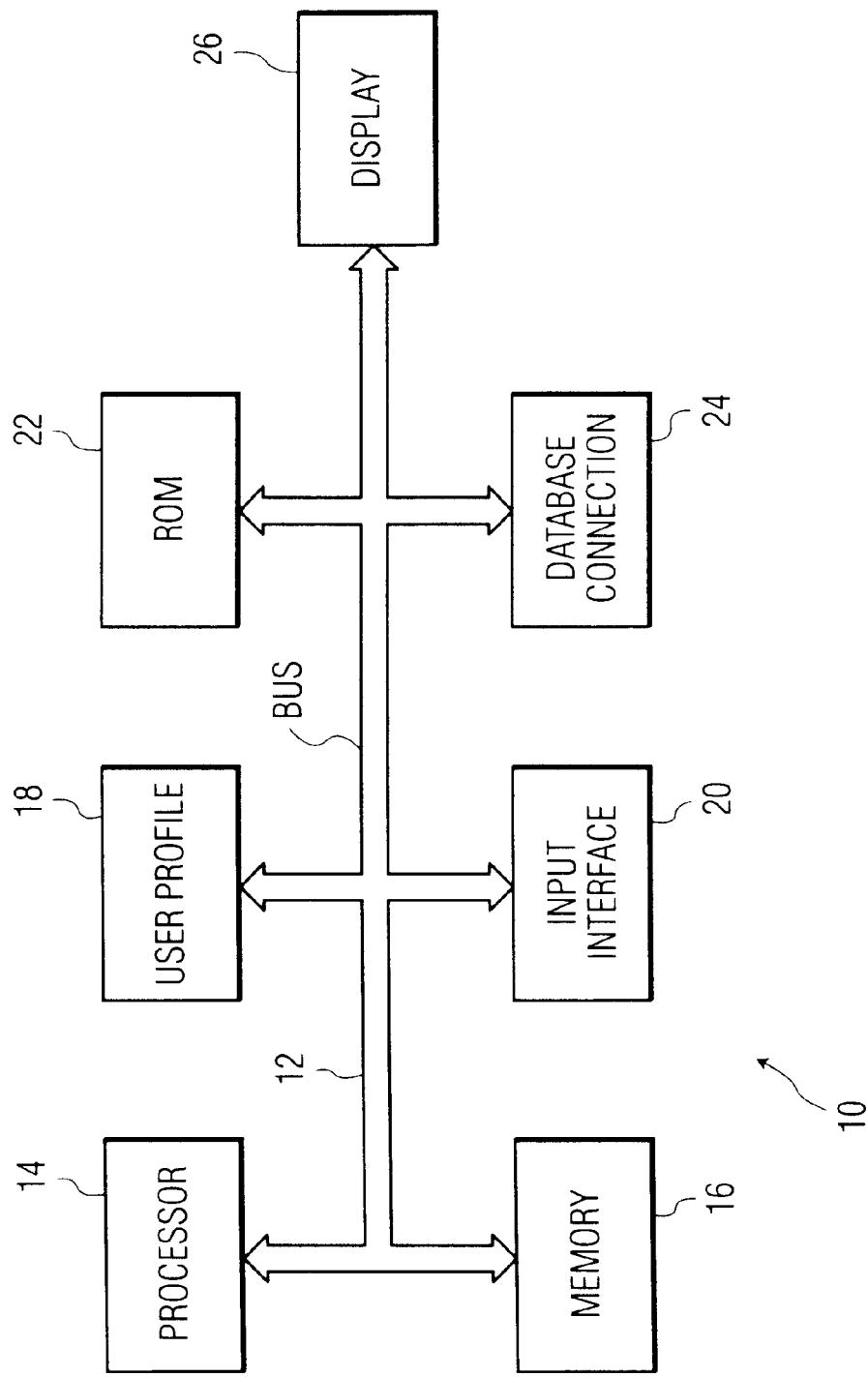

FIG. 1 illustrates an exemplary embodiment of the present invention which comprises a computer system or work station having at least a processor, random access memory, and a bus that are running on the operating system. In particular, the system 10 comprises a bus 12 or other communication means for communicating information; a processor 14 or other processing means coupled to the bus 12 for processing information; a memory 16 or dynamic storage means for storing instructions and information to be executed by the processor 14 as well as other intermediate information generated during the execution of instructions by the processor 14; a user profile 18 for storing information inputted by the user; an input interface 20 for inputting information entered by the user; a read-only-memory (ROM) for storing static information and instructions for the processor 14; a database connection 24 for connecting to the database containing a group of users; and, a display 26 for displaying information processed by the processor 14. An operating system controls the allocation of system resources and performs tasks, such as processing, scheduling, memory management, networking, and I/O services, among other things. Thus, an operating system resident in memory 16 and executed by the processor 14 coordinates the operation of the other elements of the system 10. It should be noted that the inventive system 10 within the context of this disclosure includes a laptop computer, a mobile phone, and other mobile computer devices, such as a personal digital assistant (PDA), a personal communication assistant (PCA), an electronic organizer, or any duplex interactive devices.

The chosen embodiment of the present invention is a computer software executing within a computer system. Computer programs (or computer control logic) are stored in the memory 16. Such computer programs, when executed, enable the computer system 10 to perform the function of the present invention as discussed herein.

Figure 2A:
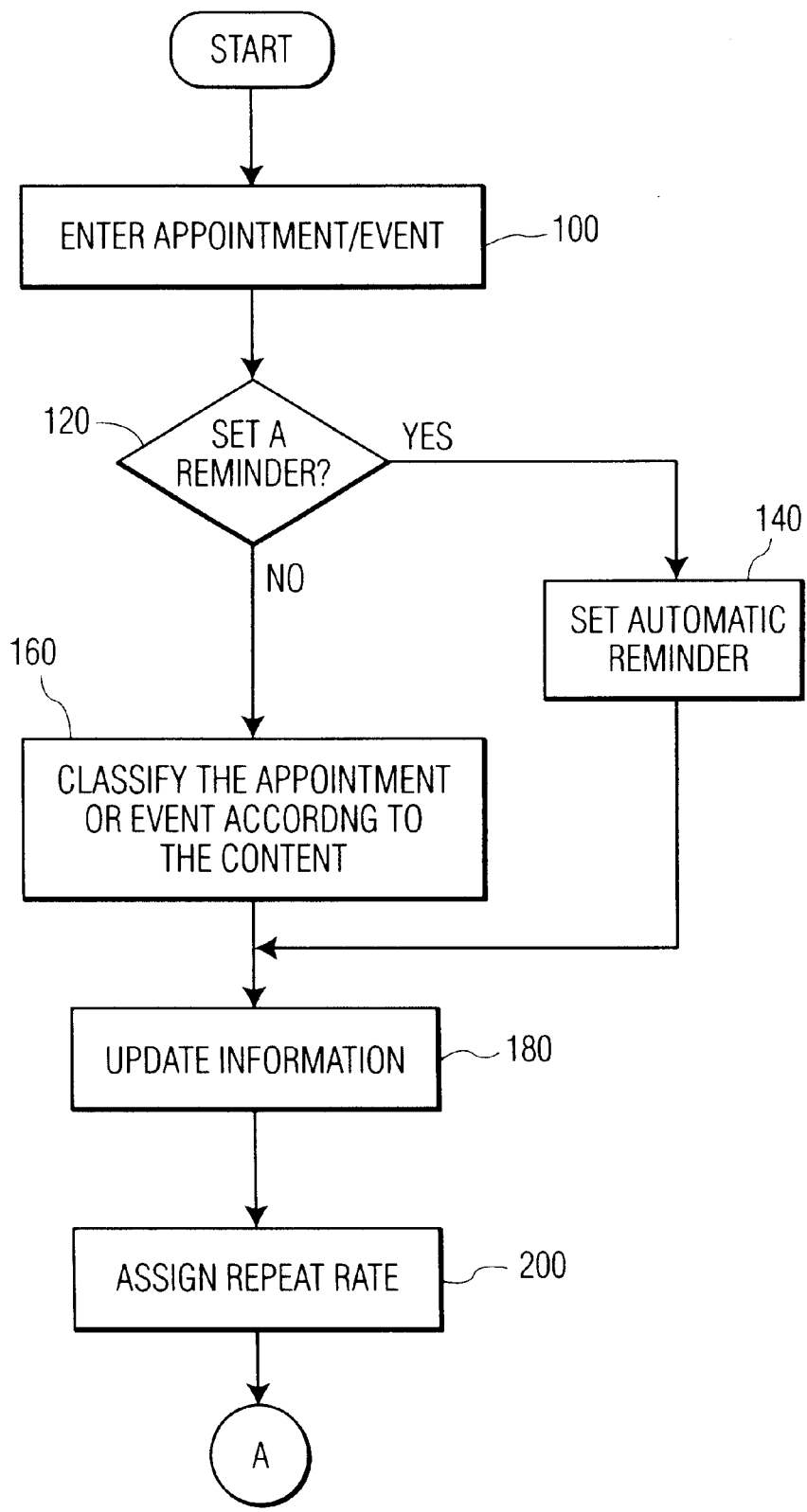

FIGS. 2(a) and (b) are flow diagrams illustrating the operation performed by the inventive system 10 in accordance with the present invention to provide a recommendation to the user. The rectangular elements indicate computer software instructions, where as the diamond-shaped block represents computer software instructions that affect the execution of the computer software instructions represented by the rectangular blocks. It should be noted that the flow diagram depicted in FIGS. 2(a) and 2(b) does not contain the syntax of any particular programming language. However, the flow diagrams illustrate that the functional information of ordinary skill in the art requires to fabricate circuits or to generate computer software to perform the processing required of the inventive system 10. In addition, it should be noted that many routine program elements, such as the initialization of loops and variables and the use of temporary variables are not shown, for simplicity and clarity.

In operation, a user of the inventive system 10 enters an appointment/event in the user profile database 18 in step 100. The entry of data can be performed through the action of the input interface 20 and can be provided in many ways, such as by keyboard, voice, or other means. In step 120, it is determined whether the user elects to be reminded of the appointment/event regularly in the future. If so, the system 10 stores the appointment/event data in the user profile database 18 for future reminder purposes in step 140. FIG. 3 is a representation of a number of different events, which occur regularly in a given year, which can be stored to remind the user according to the operation steps 120 and 140. The user enters data relating to appointments (i.e., people to meet, meetings to attend, people to call, anniversaries to celebrate, etc.) in the system 10. Each appointment is selectively classified with its own repeat rate. For example, an anniversary repeats annually, PTA meetings may repeat biyearly, a call to somebody in the hospital repeats every three days, a call to somebody in intensive care repeats daily, etc. Thereafter, the next appointment is automatically proposed to the user when its repeat time cycle approaches. Although a limited number of events is shown in FIG. 3 for illustrative purposes, it is to be understood that the inventive system 10 can support a much larger number of events. Thus, the number of reminders in the drawing should not impose limitations on the scope of the invention.

If a reminder is not set regularly in step 120, the appointment/event entered by the user is classified according to the content of the appointment/event. There are many commercially available text recognizing applications, which can be used to identify key words from text data. For example, if the user enters, "play golf with Tony", the inventive system 10 will classify this entry under a category of "golf with Tony". FIG. 4 is a representation of a table categorizing different appointment/events according to the operation step 160. Hence, if the event calls for a golf outing with a friend, Tony, the information relating to Tony is recorded in the user profile database 18. At the same time, a suitable interface may exist between the user and the inventive system 10 to selectively classify the entered appointment/event according to his or her preference. The user profile database 18 also includes information relating to golf outings with Tony from previous years. It should be noted that FIG. 4 is shown for illustrative purposes and the number of content classification can be achieved in many different forms. Thus, the table shown in FIG. 4 should not impose limitations on the scope of the invention.

Thereafter, the frequency of appointment/event in the current year is updated in step 180. Consequently, the repeat rate for a current year can be obtained in step 200. This current repeat rate is used to remind the same event even though the user has not set an automatic reminder operation in step 140.

Figure 2B:
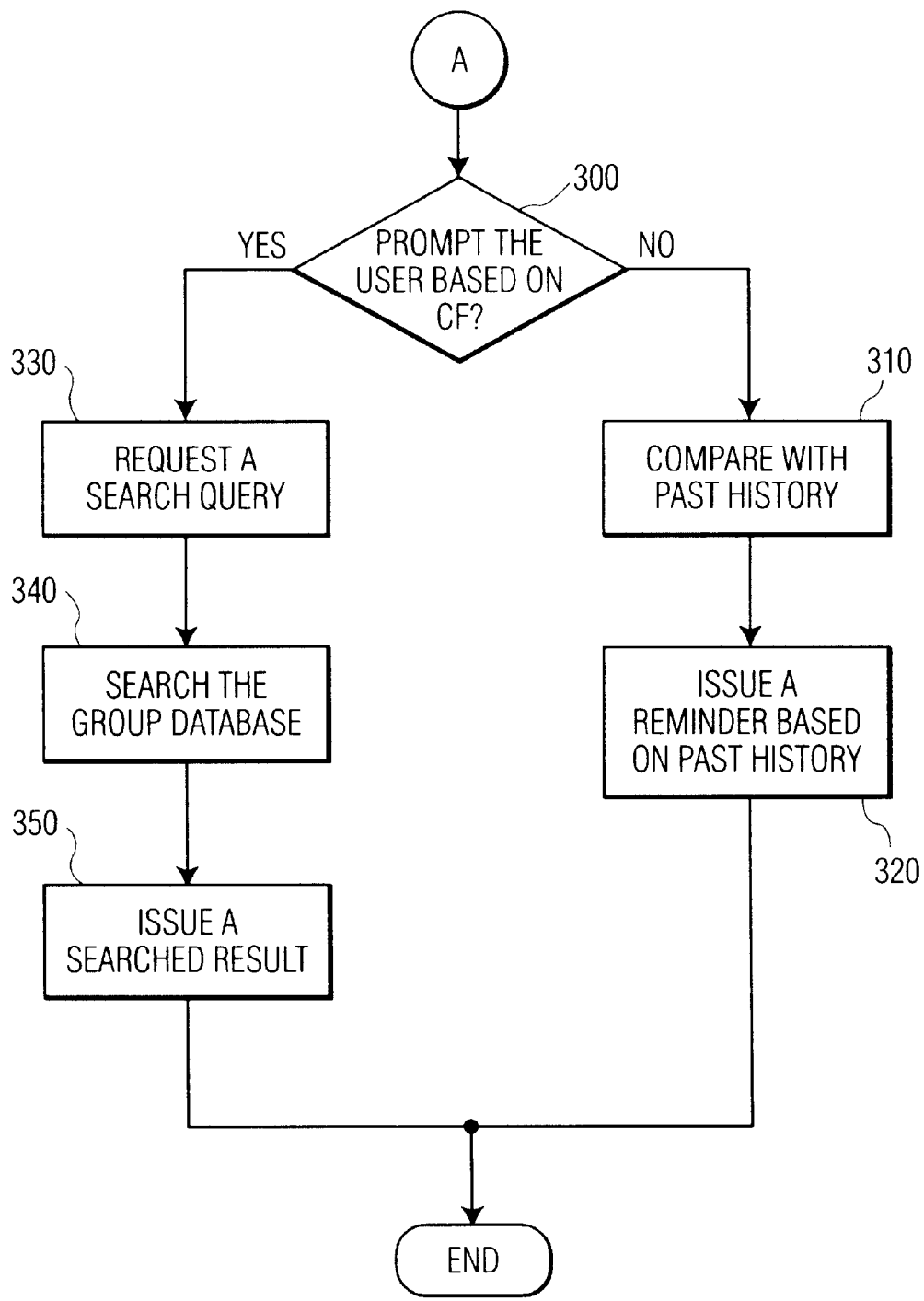

With continued reference to FIG. 2(b), it is determined whether a user elects to recommend at least one item based on a collaborating filtering process. If not, the future reminder is determined based on the user's past history. For example, as shown in FIG. 4, if a golf outing with Tony occurred at least more than three times in the past two years, 1999 and 2000, and if only one golf outing is attended in the current year 2001, the system 10 would send a reminder message to recommend a golf outing with Tony at least three times in the current year 2001. Although a period of one year is shown in FIG. 4 for illustrative purposes, it is to be understood that the inventive system 10 can support different reminder cycles for a particular event. Thus, the period of setting the frequency of a particular event for a future reminder in the drawing should not impose limitations on the scope of the invention.

If a collaborative filtering process is elected in step 300, the repeat rates for less common appointments are obtained based on the entries of other users on their calendars. The CF approach requires large numbers of data to formally register with the system and make preference judgments about the information content the system receives. To this end, the database connection circuit 24 of FIG. 1 is connected to a remote database (not shown), which contains daily information related to other people. In the embodiment, the information used to determine whether a user should be reminded of a particular event is gleaned from the past activities of the other users, including the frequency of such events and the nature of the event. This information is used as the basis for calculations, which generate a (usually numeric) reminder of similar activities in the future. Examples of such reminder rates are well known to programmers of ordinary skill in the field of collaborative filtering. To compute these degrees of reminder rates, data tracking of other users over time is required. From this database, the system 10 knows which event/meeting other users have performed, and, possibly, how often other users have performed the event, and the frequency of events in the past, and/or other information. In order to compute a future repeat rate for a given event/meeting, the system 10 compares the stored tracking information. To this end, certain mathematical and statistical techniques can be used to compute a number, which represents the amount of a likely similarity of interests in a meaningful way, based on such database. These techniques are described in U.S. Pat. No. 5,884,282, filed Apr. 9, 1998, the teachings of which are incorporated herein by reference. Thus, if the user requests the frequency of a particular event/meeting by others in step 330, then the software can check to see who and when have attended that particular event/meeting in step 340. FIG. 5 is a representation of the database containing information related to other group of other users. The operation steps shown in FIG. 2(a) are performed to obtain the data depicted in FIG. 5, and stored in a remote database (not shown). As the remote database contains frequency of events for various items, the inventive system 10 can determine which events are most likely to occur via the collaborative filtering process. For example, if the user wishes to know which individuals play golf on a regular basis, the user would request a search query, "Golf", in step 330. Then, the system 10 cause to search the database (shown in FIG. 5) to determine names of individuals who have played golf and will likely play golf in future. In step 350, the system 10 will prompt the names of "Tony" and "Dan" as candidates who play golf on a regular basis. Hence, if the user wishes to play golf with others, the system 10 can simply tap into the database and recommend a reminder, including names of people most likely to play golf.

The various steps described hereinabove may be implemented by programming them into functions incorporated within application programs, and programmers of ordinary skill in the field can implement them using customary programming techniques in languages, such as C, Visual Basic, Java, Perl, C++, and the like.

The previous description of the preferred embodiments is provided to enable any person skilled in the art to make or use the present invention. The various modifications to these embodiments, and other embodiments, will be readily apparent to those skilled in the art, without the use of the inventive faculty. Thus, the present invention is not intended to be limited to the embodiments shown herein but is to be accorded the widest scope consistent with the principles and novel features disclosed herein.

What is claimed is:

1. A method for recommending a future reminder for a user of a calendaring system, the method comprising the steps of:
   (a) entering a plurality of events interactively in said system by said user;
   (b) storing data that is entered into said system according to a nature of the information content in each of said events;
   (c) monitoring a frequency with which said user attends each of said events and a past frequency with which other users attend each of said events; and,
   (d) deriving a future repeat rate for each of said events based on the information obtained from said monitoring step.

2. The method of claim 1, further comprising the step of notifying said user of said future reminder based on said derived future repeat rate.

3. The method of claim 2, wherein said step of notifying said user of said future reminder includes the steps of:
   obtaining a past frequency with which said user attends each of said events; and,
   comparing said past frequency with said monitored frequency to determine which one of said events to recommend to said user for said future reminder.

4. The method of claim 1, further comprising the step of recording said monitored frequency in a user profile database.

5. The method of claim 1, wherein said future repeat rate is determined according to a collaborative filtering process.

6. A method for recommending a future meeting to a user of a calendaring system, the method comprising the steps of:
   (a) entering a number of events by said user for storage in a user profile database;
   (b) determining whether one of said events should be reminded to said user automatically, and if so, storing one of said events in said user profile database for an automatic future reminder;
   (c) updating a frequency with which said user attends each of said events within a predetermined time period according to the types of said events;
   (d) retrieving a past frequency with which said user attends each of said events from said user profile database;
   (e) comparing said updated frequency with said past frequency to determine which one of said events to recommend to said user for said future meeting; and,
   (f) deriving a future repeat rate for each of said events based on the information obtained from said comparison step.

7. The method of claim 6, further comprising the step of notifying said user of said future meeting based on said derived repeat rate.

8. The method of claim 6, further including the step of entering the number of said events into said system interactively.

9. The method of claim 6, further including the step of storing said updated frequency with which said user attends each of said events in said user profile database.

10. A method for recommending a future meeting to a user of a calendaring system, the method comprising the steps of:
    (a) entering a number of events by a plurality of users interactively;
    (b) storing said events into a database according to a nature of the information content in each of said events;
    (c) updating a frequency with which said users attend each of said events within a predetermined time period;
    (d) in response to a first user, searching a past frequency with which said other users attend each of said events from said database;
    (e) comparing said updated frequency with said past frequency to determine which one of said events to recommend to said user for said future meeting; and,
    (f) deriving a future repeat rate for each of said events based on the information obtained from said comparison step.

11. The method of claim 10, further comprising the step of notifying said first user of said future meeting based on said derived repeat rate.

12. The method of claim 10, further including the step of storing said updated frequency with which said users attend each of said events in said database.

13. The method of claim 10, wherein said step (a) of entering the number of said events further including the steps of:
    determining whether one of said events should be reminded to said user automatically; and,
    if so, storing one of said events in said database for an automatic future reminder; and,
    if not, performing said step (b) through said step (f).

14. The method of claim 10, wherein said future repeat rate is determined according to a collaborative filtering process.

15. A system for recommending a future meeting to a user, comprising:
    an interface for entering a number of events by said user;
    a storage for storing data entered into said system;
    a processor for updating a frequency with which said user attends each of said events within a predetermined time period according to the types of events, for searching a past frequency with which other uses attend each of said events, for comparing said updated frequency with said past frequency to determine which one of said events to recommend to said user for said future meeting, and for deriving a future repeat rate for each of said events based on the information obtained from said comparison step.

16. The system of claim 15, further comprising a means for notifying said user of said future meeting based on said future repeat rate.

17. The system of claim 15, further comprising a display means for displaying a reminder for said future meeting according to said future repeat rate.

18. The system of claim 15, further comprising a means to interface with a database containing information relating to a group of other users.

* * * * *